United States Patent [19]

Sudmanns

[11] Patent Number: 5,157,924

[45] Date of Patent: Oct. 27, 1992

[54] TURBO SUPERCHARGING SYSTEM FOR AN INTERNAL-COMBUSTION ENGINE HAVING CONTROLLABLE CHARGE AIR COMPRESSORS

[75] Inventor: Hans Sudmanns, Friedrichshafen, Fed. Rep. of Germany

[73] Assignee: MTU Friedrichshafen GmbH, Fed. Rep. of Germany

[21] Appl. No.: 705,527

[22] Filed: May 24, 1991

[30] Foreign Application Priority Data

Oct. 17, 1990 [DE] Fed. Rep. of Germany ....... 4016776
Mar. 28, 1991 [DE] Fed. Rep. of Germany ....... 4011035

[51] Int. Cl.⁵ ............................................. F02B 37/12
[52] U.S. Cl. ..................................................... 60/612
[58] Field of Search ..................... 60/611, 612; 123/562

[56] References Cited

U.S. PATENT DOCUMENTS 2,387,560 10/1945 Boulet ............................. 60/612 X

FOREIGN PATENT DOCUMENTS 2855551 7/1980 Fed. Rep. of Germany .
3932721 10/1990 Fed. Rep. of Germany ........ 60/612
231639 7/1944 Switzerland ........................... 60/612
238900 12/1945 Switzerland ........................... 60/612

Primary Examiner—Michael Koczo
Attorney, Agent, or Firm—Barnes & Thornburg

[57] ABSTRACT

A turbo supercharging system for an internal-combustion engine having controllable plural charge air compressors wherein the charge air compressors are in a permanent driving connection with an exhaust gas turbine during all operating times of the internal-combustion engine. The control of charging air is by switching the flow through the compressors; wherein at engine idle, flow is through a low capacity compressor and a high capacity compressor, exhausts to atmosphere; wherein at an intermediate partial load condition where flow is through the high capacity compressor and the low capacity compressor exhausts to atmosphere; wherein at a full load condition the compressors are serially connected together to feed the internal-combustion engine.

17 Claims, 3 Drawing Sheets

TURBO SUPERCHARGING SYSTEM FOR AN INTERNAL-COMBUSTION ENGINE HAVING CONTROLLABLE CHARGE AIR COMPRESSORS

BACKGROUND AND SUMMARY OF THE INVENTION

The invention relates to a turbo supercharging system for delivering a charge to an internal-combustion engine, having plural controllable charge air compressors always in a driving connection with an internal-combustion engine exhaust gas turbine during the operating periods of the internal-combustion engine and wherein switching means are provided for the plural charge air compressors to control inlet pressure led to the plural charge air compressors.

In the partial load and partial rotational speed operation of a supercharged internal-combustion engine, it is advantageous to adapt the turbo supercharging system to reduce development of engine exhaust gas energy while optimizing the charge air supply for the engine.

A supercharging aggregate of this general type is known from German Patent Document DE-PA 39 32 721 wherein the charge air supply of the internal-combustion engine takes place by connecting and disconnecting one of two parallel operating charge air compressors in accordance with engine operating conditions.

Although the driven charge air compressor, which is to be disconnected, is connected to a common air intake line, it is set to a so-called idle delivery by opening of a venting outlet. At the rotational rotor runner speed of the supercharging system determined by the exhaust gas turbine and by the other charge air compressor which is set for delivery, the idle-delivery charge air compressor has a power consumption rate which is significantly reduced in comparison to its designed operating point. The low pressure ratio obtained stems only from flow and separation losses while the air mass flow stems from the momentary rotational speed of the rotor runner. Nevertheless, the power consumption of the idle-delivery charge air compressor is of an amount which noticeably impairs the efficiency of the supercharging aggregate.

It is therefore an object of the invention to achieve a minimizing of the power consumption of the charge air compressor set to idle-delivery for a turbo supercharging system with controllable charge air compressors always in a driving connection with a driving motor.

According to the invention this object is achieved by having a distributing means located upstream of a charge intake of each controllable charge air compressor which can be switched in several steps to control the origin of a source of charge to each of the plural compressors; wherein a flow control means is arranged between the distributing means and the charge intakes for controlling the charge flow at the charge intakes; wherein at least one gas supply line is connected to the inlet of each distributing means; and wherein a source of air is also connected to said inlet of said distributing means.

It is advantageous if the gas supply line is connectable by the distributing means to an inlet of one of the charge air compressors supplying charge to the internal-combustion engine to supply air to said one compressor from another of said compressors. The gas supply line can be connected to an exhaust plenum line of the internal-combustion engine to permit the distributing means to provide internal-combustion engine exhaust to the inlet of one of the plural compressors or to an exhaust pipe of the exhaust gas turbine. It is desirable if a reverse-flow blocking device is arranged in the exhaust pipe downstream of a connecting point for the gas supply line and if a gas cooler is inserted into the gas supply line between the exhaust pipe and the distributing means.

It is also advantageous if an exhaust gas compressor is located downstream of an exhaust gas cooler located in the gas supply line to draw air therethrough.

As an alternative there can be two gas supply lines with the gas supply line connected to the exhaust pipe being connected to a gas supply line from an outlet of one of the plural compressors and these combined two gas lines connected to the distributing means. Here an can be provided downstream of the connection of the two gas supply lines and upstream of the distributing means. One can also have an exhaust gas compressor connected to the gas supply line downstream of the connection of the two gas supply lines. Also, one can provide a switchable blocking means between the exhaust gas compressor and the connection of the two gas supply lines.

The advantages achieved by the invention are that separation losses because of a faulty flow onto the rotor runner of the compressor, occurring during the idle delivery of a charge air compressor, can be eliminated by influencing the air flow at the compressor rotor intake; that a power consumption of the idle-delivery charge air compressor that approaches zero can be achieved; that an increase of power delivery is achieved by gas removal at the outlet of the exhaust gas turbine; that the remaining existing power consumption of the charge air compressor, which has an idle delivery during the idling operation of the internal-combustion engine, is approximately compensated; that a mechanical uncoupling between the charge air compressor and its driving machine is not necessary; and that a rapid operational readiness is obtained in the case of a transition to the series connected condition of the charge air compressors.

Other objects, advantages and novel features of the present invention will become apparent from the following detailed description of the invention when considered in conjunction with the accompanying drawings.

DETAILED DESCRIPTION OF THE DRAWINGS

Figure 1:
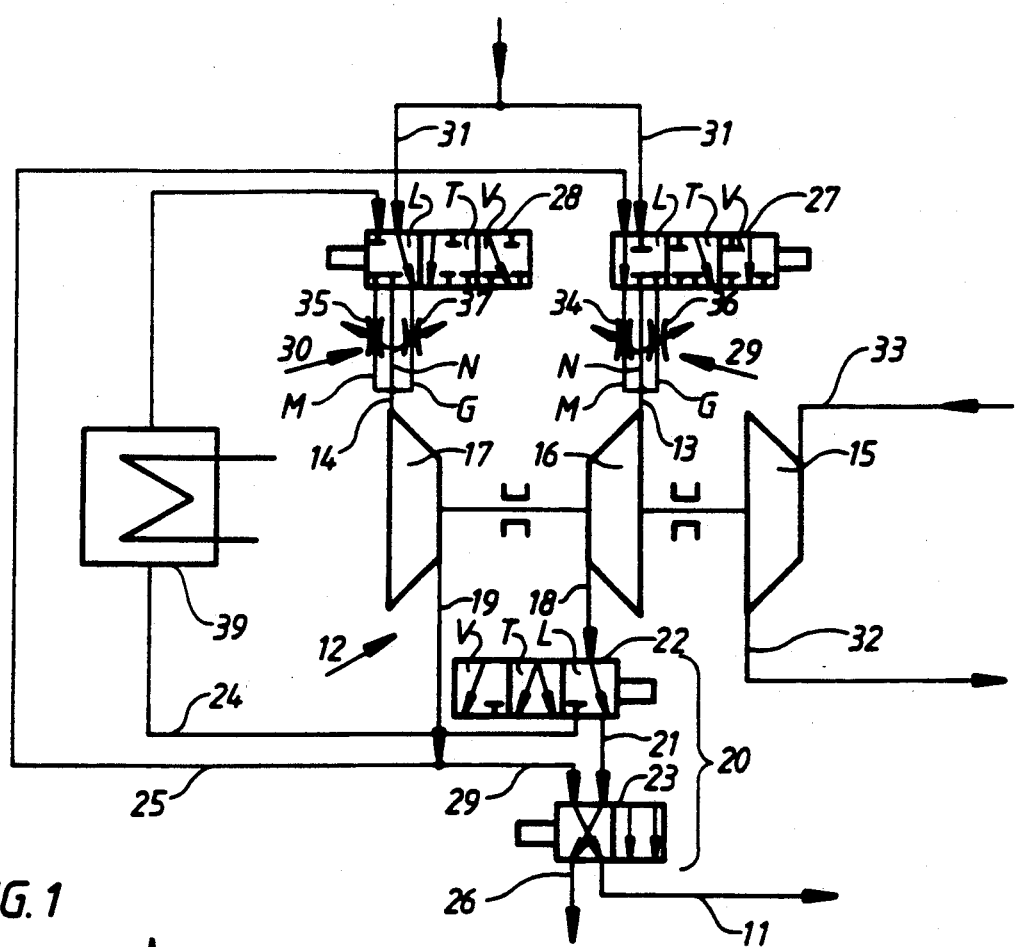
FIG. 1 is a schematic view of a supercharging system with controllable charge air compressors, an exhaust gas turbine and compressed-air removal.

A supercharged internal-combustion engine, (not shown) is supplied with a precompressed air charge by an exhaust-gas-driven free-running turbo supercharger system 12 through a charge air collecting duct 11. The turbo supercharger system 12 is constructed with one shaft and comprises an exhaust gas turbine 15, a controllable first charge air compressor 16 as well as a controllable second charge air compressor 17. Both compressors 16 and 17 are in a permanent driving connection with the exhaust gas turbine 15.

The pressure outputs 18, 19 of the charge air compressors 16, 17 are connected to inputs of a change-over device 20 which is formed of two change-over slide valves 22, 23. The two valves 22, 23, are connected by a line 21. The changeover device 20 controls the switching condition from idle delivery through light load, to normal load, to heavy load and then to maximum delivery operation of the two charge air compressors 16, 17 for the operation of the internal-combustion engine with a single-stage or double-stage charge air compression. The pressure outlet 18 of the first charge air compressor 16 leads to the input of the first change-over slide valve 22. The change-over slide valve 22 has one output connected to a gas feed line 24 which leads to the air intake 14 of the second charge air compressor 17. The second output of the change-over valve 22 connects with line 21 that leads to a first input of the second change-over slide valve 23. The pressure outlet 19 of the second charge air compressor 17 leads to a second input of the second change-over slide valve 23 which has a venting outlet 26 and another outlet to which the charge air collecting duct 11 of the internal-combustion engine is connected. A gas feeding line 25 branches off the pressure outlet 19 and leads to the air intake 13 of the first charge air compressor 16.

In front of the air intakes 13, 14 of each charge air compressor 16, 17, is a distributing slide valve device 27, 28 respectively. The distributing slide valve devices 27, 28 can be switched into three positions. On the input side, the distributing slide valve devices 27, 28 are jointly connected to the air intake line 31. According to FIG. 1, distributing slide valve device 27 is also connected on the input side with the charge recirculation line 25 and distributing slide valve device 28 is connected on its input side with the charge recirculation line 24.

A flow control device 29, 30 is arranged between each distributing slide valve device 27 and 28 and the respective air intake 13, 14 of each of the two charge air compressors 16, 17 for controlling the direction of the air flow at the impeller intake. Each of the flow control devices 29, 30, which have the same construction, has three separate flow paths—"G", "M", "N"—which can each be accessed by one outlet of the distributing slide valve devices 27, 28. The flow paths "G" and "M" of both flow control devices 29, 30 are equipped with adjustable throttling devices 34, 35, 36, 37 which vary the flow-through cross-section of the momentary air mass flow therethrough. The flow paths "G", "M", "N" are combined upstream of the air intakes 13, 14 of the charge air compressor 16, 17.

In operation of the two charge air compressors 16, 17, only one of the three flow paths "G", "M", "N" is operative. When flow path "G" is selected, a so-called countertwist occurs at the impeller intake. Here the flow direction is directed against the normal rotating direction of the impeller. Selection of flow path "N" causes an irrotational neutral flow against the impeller blading. When flow path "M" is selected, a so-called co twist occurs at the impeller intake. Here the flow direction is the same as the rotating direction of the impeller.

During idling and light load of the internal-combustion engine, a low charge of air is obtained by use of the second charge air compressor 17 alone. In these operating stages, the first charge air compressor 16, while driven by the turbine, is set to idle delivery. Idle delivery is achieved by connecting the pressure outlet 18 through change-over slide valve 22, line 21, with the change-over slide valve 23 switched to connect with the venting outlet 26. Thus, despite rotating of the turbo supercharger system 12, no significant delivery pressure can build up in the pressure outlet 18 of the first charge air compressor 16. Also during idle and light loads, the passage from the pressure outlet 18 to the charge recirculation line 24 is blocked at the change-over slide valve 22, while the distributing valve device 28 (for the second charge air compressor 17) is switched to open passage between air intake line 31 and air intake 14 (switching position "L") and the pressure outlet 19 of the second charge air compressor 17 at the change-over slide valve 23 is connected with the charge air collecting line 11 leading to the internal-combustion engine. The second charge air compressor 17 is therefore the only air compressor used for the charge air supply of the internal-combustion engine during idle and light loads.

Figure 2:
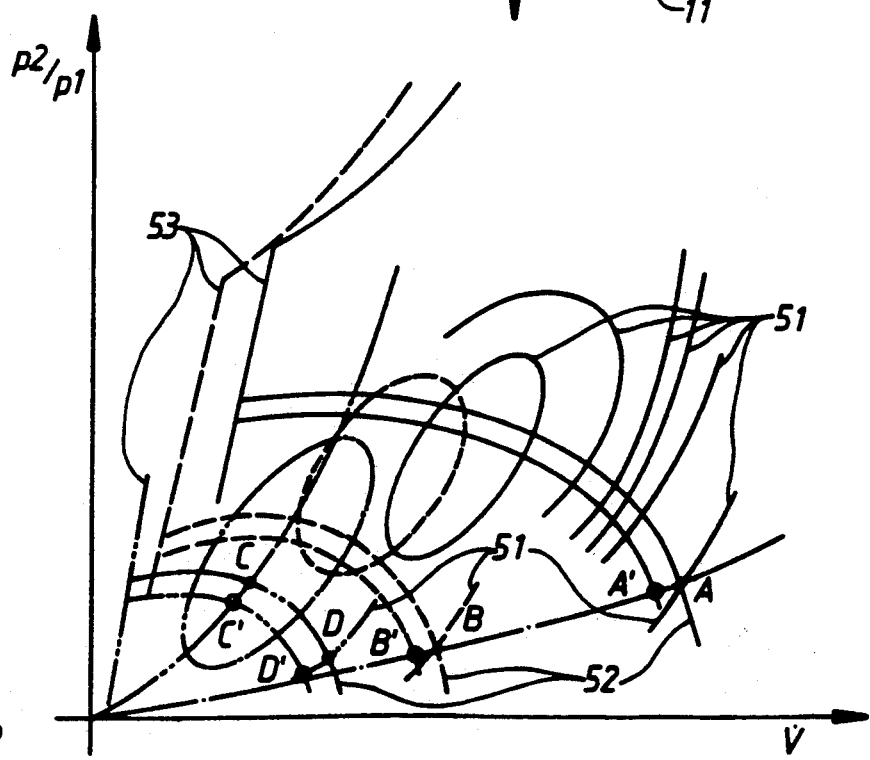
FIG. 2 is a characteristic diagram of a controllable charge air compressor.

The characteristic compressor diagram illustrated in FIG. 2 shows the basic shifting of the compressor operating point of a charge air compressor 16, 17 set to idle delivery under the influence of the measures described in the following text. In this diagram the pressure ratio "p1/p2" across the air compressor is entered on the ordinate and the air volume flow "V" is entered on the abscissa. Identical types of lines characterize the respective curves which belong together for constant efficiency 51, same rotational impeller speed 52, and the pumping limit 53. A charge air compressor 16 or 17, which is set to idle delivery (switching position "V" of the distributing valve device 27, 28 with the passage from the air intake line 31 to the air intake 13 or 14 is open) would operate at operating point "A" of the characteristic compressor field according to FIG. 2.

The power consumption "P" of a charge air compressor set to idle delivery is indicated by the following relationship:

$$P = \frac{V * (p^1 - p^2)}{\eta}$$

In this formula, "V" is the air volume flow; "(p1−p2)" is the pressure increase; and "$\eta$" is the efficiency of the charge air compressor 16, 17. The formula demonstrates that a reduction in any of the air volume flow, the pressure increase, or an improvement of the efficiency all results in a reduction of the power consumption.

The respective achievable improvement is explained by means of the characteristic compressor diagram in which the first charge air compressor 16 is set to idling delivery. The same information also applies when the second charge air compressor 17 is set to idling delivery and the first charge air compressor 16 alone meets the charge air requirement during a partial load of the internal-combustion engine.

When flow path "M" is selected in the flow control device 29 and air taken in by the idle-delivering first charge air compressor 16 enters into the impeller with a co-twist, a shifting of the operating point from "A" to "B" takes place in the characteristic compressor diagram. At point "B", the pressure ratio and the air mass flow are clearly reduced in comparison to point "A".

When the air mass flow flow-through cross-section is additionally optimized by the throttling device 34 arranged in the flow path "M", another shift of the operating point will occur from "B" to "C" toward less power consumption. Although the pressure ratio at point "C" is increased in comparison to "B", the air mass flow has continued to be considerably reduced. Instead, the idle-delivering first charge air compressor 16 operates at best efficiency in Point "C".

Another possibility for reducing the power consumption of the first charge air compressor 16 (set to idle delivery) exists when, in addition to all other already mentioned measures, the air that is delivered during idle does not have to be removed by suction but is guided to the air intake 13 as compressed air. This measure is illustrated by the position of the delivery slide valve devices 27, 28 in FIG. 1. The compressed-air removal takes place at the pressure outlet 19 of the second charge air compressor 17 by way of the gas supply line 25 Then, at position "L" of the distributing slide valve device 27, the compressed air enters into the air intake 13 through flow path "M" and correspondingly adjusted throttling device 34. In the characteristic compressor diagram, the shift of the operating point from "C" to "D" for charge air compressor 16 will then take place.

Another reduction of the power consumption of the idle-delivering first charge air compressor 16 is achieved when the intake air of the second charge air compressor 17, which is set to delivery operation through flow path "G" of flow control device 30, enters the impeller with a countertwist. This has the effect that the charge pressure demanded by the internal-combustion engine is achieved at a lower rotational speed of the turbo supercharged system 12. Here the effective power consumption of the idle-delivering charge air compressor 16 is further reduced with respect to its level because of the lower rotational speed of the rotors. In this case, the compressor operating points are obtained which in the characteristic compressor diagram according to FIG. 2 are marked with "A'", "B'", "C'", and "D'".

All above-described measures relate to the operating condition of the internal-combustion engine during idling and with a low load. When the internal-combustion engine operates at partial load, a higher air mass flow is required for the charge air supply which can be supplied by the first charge air compressor 16 alone which was conceived for a higher delivery capacity; i.e., during partial load, the second charge air compressor 17 is set to idle delivery, and the first charge air compressor 16 is set to deliver the charge to the internal-combustion engine.

For this change-over, the change-over slide valve 22 changes from position "L" into position "T"; change-over slide valve 23 changes into the other switching position from that shown in FIG. 1. The distributing valve devices 27, 28 both also change from position "L" to position "T".

All initially described measures for the reduction of the power consumption of the idle-delivering charge air compressor 16 after this change-over are also effective for the second charge air compressor 17 which now carries out the idle delivery at partial load. The compressed-air supply to the air intake 14 of the second charge air compressor 17 takes place by way of the gas feeding line 24 which is connected to an outlet of the change-over slide valve 22 and thus to the charge air delivery of the first charge air compressor 16.

During the full-load operation of the internal-combustion engine, the two charge air compressors 16, 17 operate while being connected in series with two-stage charge air compressing. Change-over slide valve 22 and distributing valve devices 27, 28 are then shifted into position "V", whereas change-over slide valve 23 changes back into the position shown in FIG. 1.

Figure 3:
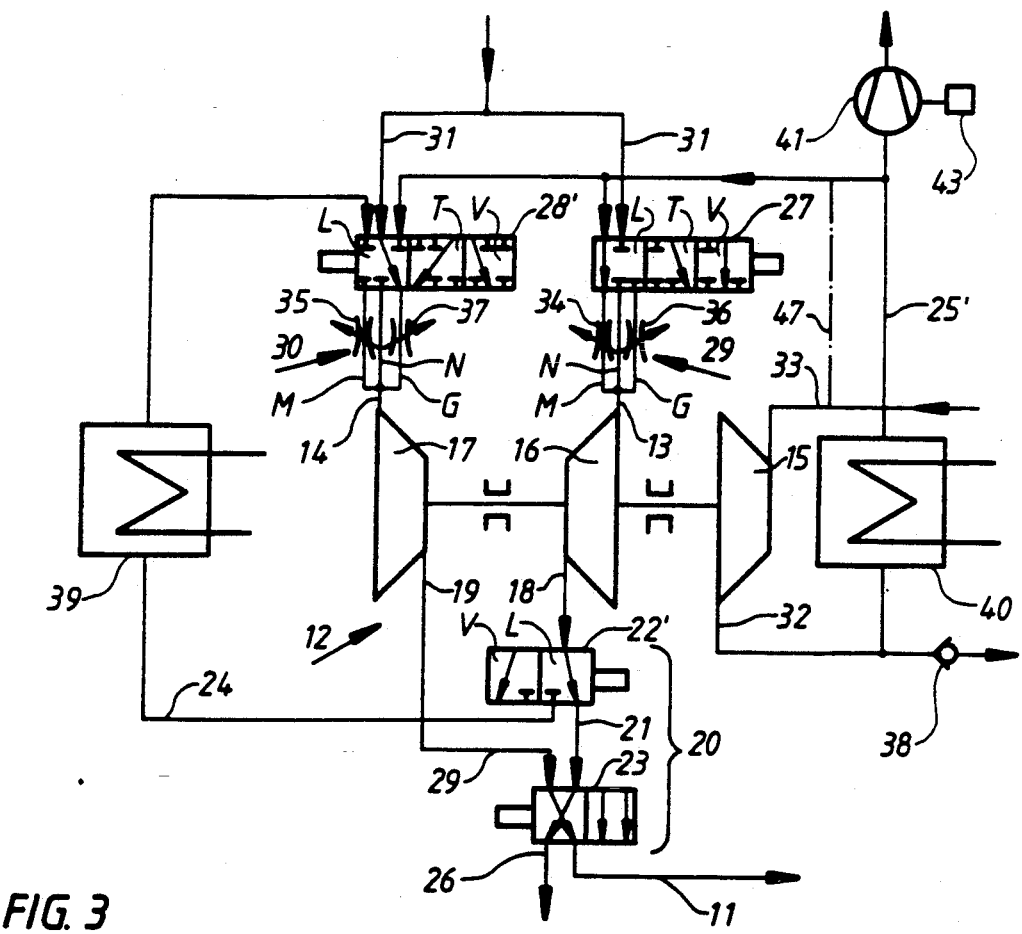
FIG. 3 is a view of a supercharging system with controllable charge air compressors, with an exhaust gas turbine exhaust gas supply by way of a gas cooler to the disconnected charge air compressor and with an exhaust gas extraction compressor.
Figure 4:
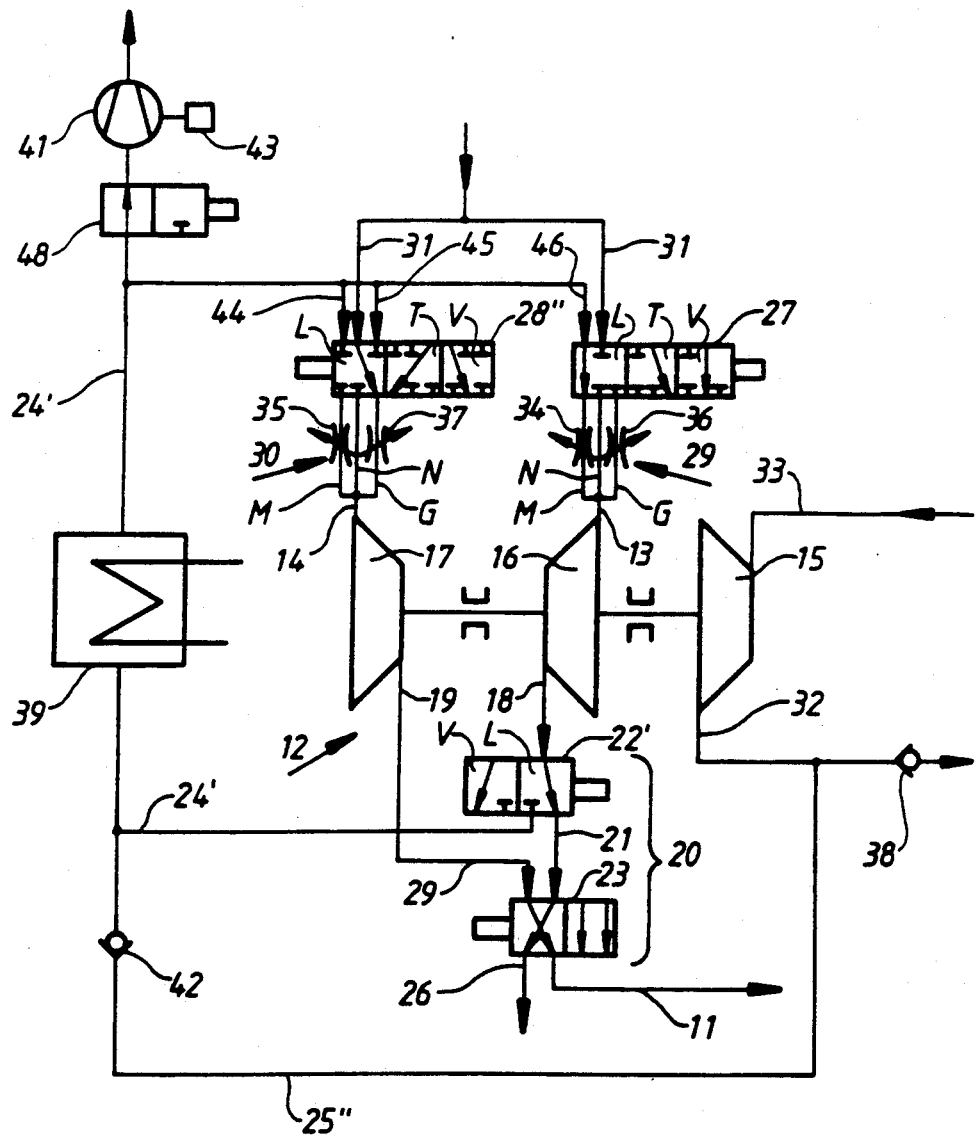
FIG. 4 is a schematic view of a supercharging aggregate with controllable charge air compressors with an exhaust gas turbine, with an exhaust gas supply by way of the charge air intercooler to the disconnected charge air compressor, and with an exhaust gas extraction compressor.

Although the above-described compressed-air removal in the case of the charge air compressor 16 or 17, that was just set to delivery, impairs the charge air supply of the internal-combustion engine only slightly, it is affected nevertheless. This impairing of the charge air supply of the internal-combustion engine can be avoided by means of the arrangements described in FIG. 3 and FIG. 4. The difference in comparison between the embodiment according to FIG. 1 and that of FIGS. 3 and 4 is due to a different source of the gas which is supplied to the respective idle-delivering charge air compressor. In the embodiments according to FIG. 3 and FIG. 4, instead of compressed air, exhaust gas is supplied to the air compressors, which exhaust gas is removed from the exhaust pipe 32 of the exhaust gas turbine 15. The gas supply line 25' is arranged for this purpose and leads from the exhaust pipe 32 to the distributing valve devices 27 and 28' The exhaust gas supply is effective on that charge air compressor 16 or 17 which at the time is set to idle delivery. Thus exhaust gas is fed to charge air compressor 16 in position "L" of the distributing valve device 27 corresponding to the idling and low load of the internal-combustion engine and to charge air compressor 17 in position "T" of the distributing valve device 28', corresponding to the partial load of the internal-combustion engine.

The first charge air compressor 16, which has an idle delivery during idling and low load of the internal-combustion engine is designed with such a high idle-delivery rate, that the whole exhaust gas volume occurring during idling and low load is sucked out of the exhaust gas pipe 32 to cause the pressure in the exhaust pipe 32 to fall below atmospheric pressure. In order to prevent an afterflow of air from the environment into the exhaust pipe 32, a reverse-flow blocking device 38 is arranged downstream of the connecting point for the gas supply line 25' in the exhaust pipe 32. The reverse-flow blocking device 38 may be constructed to be automatically controllable or to be controllable by operating parameters of the internal-combustion engine.

A gas cooler 40 is arranged in the gas supply line 25' so that the exhaust gas volume taken in from the idle-delivering first charge air compressor 16 is reduced by cooling. As a result of the pressure reduction in the exhaust pipe 32 by means of the exhaust gas intake, the efficiency gradient of the exhaust gas turbine 15 is enlarged, which increases its useful performance. The achievable power increase of the exhaust gas turbine 15 compensates for the power consumption of the then running but idle-delivering first charge air compressor 16. As a result of the exhaust gas cooling, there is even a slight power excess at the exhaust gas turbine 15, the amount of which depends on the removed amount of heat.

The pressure decrease in the exhaust pipe 32 of an idle-delivering charge air compressor 16 is achievable only by the larger first charge air compressor 16 being set to idle delivery during the idling and low load of the internal-combustion engine. In contrast the idle-delivery rate of the smaller second charge air compressor 17, which is set to idle delivery at partial load of the internal-combustion engine, is not sufficient for achieving a pressure decrease or a power excess of the exhaust gas turbine 15 in the exhaust pipe 32. To compensate here an exhaust gas compressor 41 (with a drive 43) is connected on its suction side to the gas supply line 25' downstream of the gas cooler 40. The operation of the exhaust gas compressor 41 is always started when the second charge air compressor 17 is set to idle delivery. The exhaust gas compressor 41 and the second charge air compressor 17 will then operate in parallel and take in exhaust gas from the exhaust pipe 32. Also during partial load of the internal-combustion engine, a pressure reduction in the exhaust pipe 32 is achieved in this manner. Thus during idling and low-load operation of the internal-combustion engine, the desired power increase of the exhaust gas turbine 15 is also achieved.

In the embodiment according to FIG. 4, the gas supply line 25" leads from the exhaust pipe 32 to the gas supply line 24' upstream of the charge air intercooler 39. The gas supply line 24' is connected to the inlets 44, 45 of the distributing valve device 28" as well as to the inlet 46 of the distributing valve device 27. Here the charge air intercooler 39 (during idling, low load and partial load of the internal-combustion engine) acts as a gas cooler for the exhaust gas taken in from the exhaust pipe 32. In this embodiment, the additional exhaust gas intake compressor 41 is connected to the gas supply line 24' downstream of the charge air intercooler 39.

In order to ensure (during full-load of the internal-combustion engine) the charge air transfer from the first charge air compressor 16 to the second charge air compressor 17 by the gas supply line 24' for a two-stage charging, a switchable blocking device 48 is arranged between the gas supply line 24' and the exhaust gas compressor 41 and a reverse-flow blocking device 42, which closes in the direction of the exhaust pipe 32, is arranged in the gas supply line 25".

It is also possible to tap the exhaust gas plenum line 33 of the internal-combustion engine leading to the turbine 15 by way of the gas supply line 47 (FIG. 3) as the gas source instead of the exhaust pipe 32. Here, the exhaust gas mass flow is obtained upstream of the exhaust gas turbine 15 and thus its useful performance is slightly reduced. However, this does not result in any additional compensation effect for the then idle-delivering charge air compressor with respect to operating point "D" or "D'" in the characteristic compressor diagram. However, the power consumption of the idle-delivering charge air compressor 16 or 17, because of the higher temperature and the therefore lower density of the exhaust gas fed at an excess pressure, is nevertheless reduced in comparison to operating points "A", "A'", "B", "B'", "C", and "C'" in the characteristic compressor diagram according to FIG. 2.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A turbo supercharging system for delivering a charge to an internal-combustion engine, having plural controllable charge air compressors always in a driving connection with an internal-combustion engine exhaust gas turbine during the operating periods of the internal-combustion engine and wherein distributing valve means are provided for the plural charge air compressors to control inlet pressure led to the plural charge air compressors wherein the improvement comprises:

a distributing valve means, located upstream of a charge intake of each controllable charge air compressor, which can be switched in several steps to control the origin of a source of charge to each of the plural compressors;

a flow control means arranged between the distributing valve means and the charge intakes for controlling the charge flow at the charge intakes;

wherein at least one charge recirculation line is connected to an inlet of each distributing valve means; and wherein a source of charge is also connected to said inlet of said distributing valve means.

2. A turbo supercharging system according to claim 1, wherein the charge recirculation line is connectable by the distributing valve means to an inlet of one of the charge air compressors supplying charge to the internal-combustion engine to supply charge to said one compressor from another of said compressors.

3. A turbo supercharging system according to claim 1, wherein the charge recirculation line is connected to an exhaust plenum line of the internal-combustion engine to permit the distributing valve means to provide internal-combustion engine exhaust to the inlet of one of the plural compressors.

4. A turbo supercharging system according to claim 1, wherein the charge recirculation line is connected to an exhaust pipe of the exhaust gas turbine to permit the distributing valve means to provide internal-combustion engine exhaust to the inlet of one of the plural compressors.

5. A turbo supercharging system according to claim 4, wherein a reverse-flow blocking device is arranged in the exhaust pipe downstream of a connecting point for the gas supply line.

6. A turbo supercharging system according to claim 4, wherein a gas cooler is inserted into the gas supply line between the exhaust pipe and the distributing valve means.

7. A turbo supercharging system according to claim 4, wherein an exhaust gas compressor is located downstream of an exhaust gas cooler located in the charge recirculation line.

8. A turbo supercharging system according to claim 4, wherein there are two charge recirculation lines with the charge recirculation line connected to the exhaust pipe being connected to a charge recirculation line from an outlet of one of the plural compressors and these combined two charge recirculation lines connected to the distributing valve means.

9. A turbo supercharging system according to claim 8 wherein, an intercoder is provided downstream of the connection of the two charge recirculation lines and upstream of the distributing valve means.

10. A turbo supercharging system according to claim 8, wherein an exhaust gas intake compressor is connected to the charge recirculation line downstream of the connecting of the two charge recirculation lines.

11. A turbo supercharging system according to claim 9, wherein an exhaust gas intake compressor is connected to the charge recirculation line downstream of the connection of the two charge recirculation lines.

12. A turbo supercharging system according to claim 10, wherein a switchable blocking means is arranged between the exhaust gas intake compressor and the connection of the two charge recirculation lines.

13. A turbo supercharging system according to claim 11, wherein a switchable blocking means is arranged between the exhaust gas intake compressor and the connection of the two charge recirculation lines.

14. A turbo supercharging system according to claim 8, wherein a reverse-flow blocking means is arranged in the charge recirculation line connected to the exhaust pipe.

15. A turbo supercharging system according to claim 9, wherein a reverse-flow blocking means is arranged in the charge recirculation line connected to the exhaust pipe.

16. A turbo supercharging system according to claim 8, wherein the charge recirculation line is simultaneously connected at a point downstream of the connection of the two charge recirculation lines to the distributing valve means leading to each of the plurality of compressors.

17. A turbo supercharging system according to claim 9, wherein the charge recirculation line is simultaneously connected at a point downstream of the connecting of the two charge recirculation lines to the distributing valve means leading to each of the plurality of compressors.

* * * * *